United States Patent
Joyce et al.

(10) Patent No.: US 11,133,672 B1
(45) Date of Patent: Sep. 28, 2021

(54) SYSTEM AND METHOD FOR ADDING A HIGH VOLTAGE DC SOURCE TO A POWER BUS

(71) Applicant: Hamilton Sundstrand Corporation, Charlotte, NC (US)

(72) Inventors: Thomas P. Joyce, Rockford, IL (US); Jordan K. Vanevenhoven, Rockford, IL (US); Natalie Filipski, Saint Charles, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/811,402

(22) Filed: Mar. 6, 2020

(51) Int. Cl.
*H02J 1/10* (2006.01)
*H02H 9/00* (2006.01)
*H02H 3/087* (2006.01)

(52) U.S. Cl.
CPC ............ *H02J 1/10* (2013.01); *H02H 3/087* (2013.01); *H02H 9/005* (2013.01); *B64D 2221/00* (2013.01); *H02J 2310/44* (2020.01)

(58) Field of Classification Search
CPC .... H02J 1/10; H02J 2310/44; B64D 2221/00; H02H 3/087; H02H 9/005
See application file for complete search history.

(56) References Cited

U.S. PATENT DOCUMENTS

| | | | |
|---|---|---|---|
| 7,466,038 B2 | 12/2008 | Gaudreau et al. | |
| 9,742,185 B2 * | 8/2017 | Wang | H02H 3/087 |
| 9,853,451 B2 | 12/2017 | Tenca et al. | |
| 10,164,454 B2 * | 12/2018 | Chatroux | H02J 7/007184 |
| 2004/0027734 A1 * | 2/2004 | Fairfax | H01H 9/542 361/2 |
| 2012/0104856 A1 | 5/2012 | Gottleb et al. | |

FOREIGN PATENT DOCUMENTS

| | | |
|---|---|---|
| EP | 2461456 A1 | 6/2012 |
| FR | 3067874 A1 | 12/2018 |
| GB | 1148167 A | 4/1969 |
| WO | 2008032362 A1 | 3/2008 |

OTHER PUBLICATIONS

European Search Report for Application No. 21161357.5, dated Aug. 5, 2021 66 pages.

* cited by examiner

*Primary Examiner* — Ryan Johnson
(74) *Attorney, Agent, or Firm* — Cantor Colburn LLP

(57) ABSTRACT

A system for connecting first and second high voltage direct current (HVDC) sources in parallel to a bus includes one or more contactors connecting the first HVDC source to the bus. The system also includes a bus coupling circuit located between the second HVDC source and the bus that utilizes inductors to couple, in operation, couples the second HVDC source to the bus such that first and second HVDC sources are in parallel with the second positive output is connected to the positive rail and the second negative output connected to the negative rail. The inductors are first connected to the bus though auxiliary contactors and, after a predetermined time, main contactors are closed that provide a path around the inductors.

15 Claims, 2 Drawing Sheets

SYSTEM AND METHOD FOR ADDING A HIGH VOLTAGE DC SOURCE TO A POWER BUS

BACKGROUND

Exemplary embodiments pertain to the art of power distribution and, in particular, to adding a high voltage DC source to an already powered DC bus.

Aircraft require electrical power to operate many parts of the aircraft system, including on-board flight control systems, lighting, air conditioning etc. The current and future generations of aircraft use more and more electrical control in place of convention hydraulic, pneumatic etc. control. Such aircraft have advantages in terms of the size and weight of the controls and power systems as well as in terms of maintenance and reliability.

Most current large commercial aircraft use electricity, on-board, in the form of an AC fixed frequency and/or variable frequency network. Steps have been made to move from 115 V ac to 230 V ac and more recent developments have allowed power supplies to supply high voltage dc (HVDC) e.g. +/−270 V dc, providing improvements in terms of additional functionality, power supply simplification, weight savings and thus fuel efficiency.

Generally, voltage is provided on board aircraft in one of two (or more) ways. When the aircraft is on the ground, power comes from an external ground generator supplying, say 115 V ac at 400 Hz. An auto-transformer rectifier unit (ATRU) rectifies the supply voltage to provide voltages required for the different loads on the aircraft. Instead of an ATRU, the power can be rectified by active rectification using power flow controllers.

When the aircraft is in the air the power comes from the aircraft engine or auxiliary power unit (APU) via a three-phase ac generator that is then rectified. The rectified power is provided to a so-called DC bus.

BRIEF DESCRIPTION

Disclosed is a method of connecting first and second high voltage direct current (HVDC) sources in parallel to bus including a positive rail and a negative rail. The first HVDC source has a first positive output line and a first negative output line and the second HVDC source having a second positive output line and a second negative output line. The method includes: connecting the first HVDC source to the bus such that the first positive output line is connected to the positive rail and the first negative output line is connected to the negative rail; closing a first auxiliary contactor to connect the second positive output line to the positive rail through a first inductor; closing a second auxiliary contactor to connect the second negative output line to the negative rail through a second inductor; closing, after a specified time, a first main contactor that is connected in parallel with the first auxiliary contactor and the first inductor to connect the second positive output line to positive rail and a second main contactor that is connected in parallel with the second auxiliary contactor and the second inductor to connect the second negative output line to positive rail; and opening the first and second auxiliary contactors.

In addition to one or more of the features described above, or as an alternative to any of the foregoing embodiments, the first HVDC source can include a first generator connected to a first prime mover.

In addition to one or more of the features described above, or as an alternative to any of the foregoing embodiments, the second HVDC source includes a second generator connected to a second prime mover.

In addition to one or more of the features described above, or as an alternative to any of the foregoing embodiments, the first prime mover can be one of: a low pressure spool of the gas turbine engine, a medium pressure spool of the gas turbine engine or an auxiliary power unit.

In addition to one or more of the features described above, or as an alternative to any of the foregoing embodiments, the second prime mover is one of: a low pressure spool of a gas turbine engine, a medium pressure spool of the gas turbine engine or an auxiliary power unit.

In addition to one or more of the features described above, or as an alternative to any of the foregoing embodiments, the second HVDC source includes a second generator connected to a second prime mover, wherein the second prime mover is a high pressure spool of the gas turbine engine.

In addition to one or more of the features described above, or as an alternative to any of the foregoing embodiments, the first HVDC source includes a first generator connected to a first prime mover, wherein the first prime mover is a high pressure spool of the gas turbine engine.

Also disclosed is a system for connecting first and second high voltage direct current (HVDC) sources in parallel to a bus including a positive rail and a negative rail, the first HVDC source having a first positive output line and a first negative output line and the second HVDC source having a second positive output line and a second negative output line. The system includes one or more contactors connecting the first HVDC source to the bus such that the first positive output line is connected to the positive rail and the first negative output line is connected to the negative rail. The system also includes a bus coupling circuit located between the second HVDC source and the bus that, in operation, couples the second HVDC source to the bus such that first and second HVDC sources are in parallel, the second positive output is connected to the positive rail and the second negative output is connected to the negative rail. The bus coupling circuit includes: a positive line coupler and a negative line coupler, the positive line coupler including a first auxiliary contactor and a first inductor connected in series and a first main contactor connected in parallel with the series connected first auxiliary contactor and first inductor, the negative line coupler including a second auxiliary contactor and a second inductor connected in series and a second main contactor connected in parallel with the series connected second auxiliary contactor and second inductor. The system also includes a controller configured to: close the first auxiliary contactor to connect the second positive output line to the positive rail through the first inductor; close the second auxiliary contactor to connect the second negative output line to the negative rail through the second conductor; and close the first and second main contactors after a specified time has elapsed after the first or second auxiliary contactors were closed.

In addition to one or more of the features described above, or as an alternative to any of the foregoing embodiments, the controller is further configured to open the first and second auxiliary contactors after the first and second main contactors are closed.

In addition to one or more of the features described above, or as an alternative to any of the foregoing embodiments, the first HVDC source includes a first generator connected to a first prime mover.

In addition to one or more of the features described above, or as an alternative to any of the foregoing embodiments, the first prime mover is a high pressure spool of a gas turbine engine.

In addition to one or more of the features described above, or as an alternative to any of the foregoing embodiments, the second HVDC source includes a second generator connected to a second prime mover, wherein the second prime mover is one of: a low pressure spool of the gas turbine engine, a medium pressure spool of the gas turbine engine or an auxiliary power unit.

In addition to one or more of the features described above, or as an alternative to any of the foregoing embodiments, the second HVDC source includes a battery.

In addition to one or more of the features described above, or as an alternative to any of the foregoing embodiments, the first prime mover is one of: a low pressure spool of a gas turbine engine, a medium pressure spool of the gas turbine engine or an auxiliary power unit.

In addition to one or more of the features described above, or as an alternative to any of the foregoing embodiments, the second HVDC source includes a second generator connected to a second prime mover, wherein the second prime mover is a high pressure spool of the gas turbine engine.

In addition to one or more of the features described above, or as an alternative to any of the foregoing embodiments, the second HVDC source includes a battery.

The system/method can also be used to offload power onto a source that is not under aircraft control, such as ground power.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
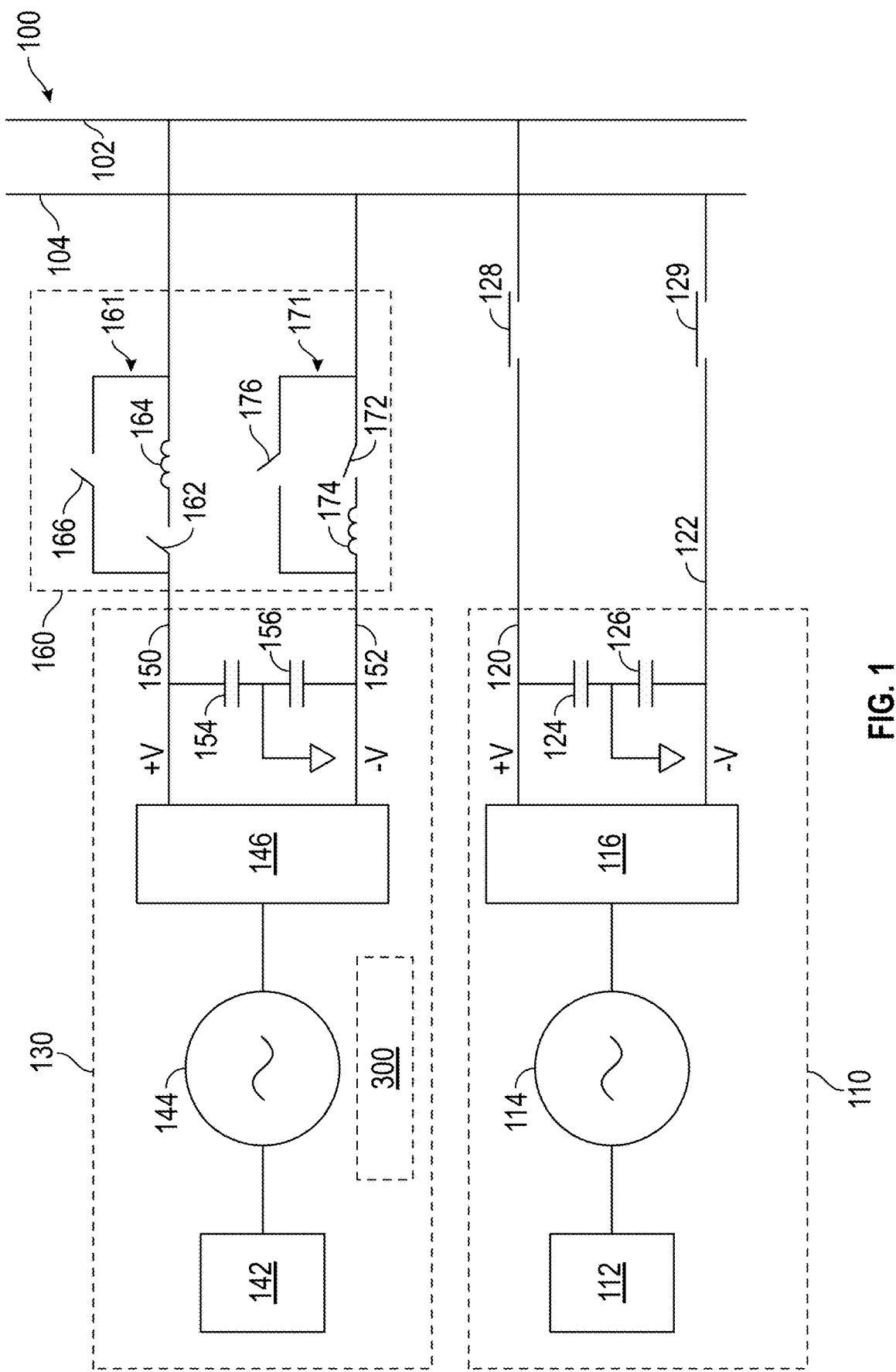
FIG. 1 is a schematic of a power bus that is initially driven by a first power source and to which a second power source is to be added in parallel.

A detailed description of one or more embodiments of the disclosed apparatus and method are presented herein by way of exemplification and not limitation with reference to the Figures.

As discussed above, when the aircraft is in the air the power comes from the aircraft engine or auxiliary power unit (APU) generally provides power to the DC bus. In some instances it may be desirable to have two sources (e.g., generators) provide to the bus at the same time. For example, in the general case, a generator connects to the high pressure spool of a gas turbine engine via gear box. The power thus produced is connected to the DC bus of the aircraft. In some instances it may be desirable to add an additional source of DC power to the bus in parallel. For example, it may be desirable to add power from a second generator connected to the low pressure spool or the APU or both to the DC bus. This can allow for the DC bus to provide more power for larger loads such as an electric propulsion system. Such instances can occur anytime increased electrical power to the DC bus is needed such as during take-off.

Bringing two HVDC channels into parallel will produce a very large current spike unless the voltages across capacitors connected to the DC bus are very close to one another. Another complication is that there are two capacitor voltages to consider, one each for the upper and lower rails of the DC bus. This current spike might weld a contactor forming the connection closed or will at least shorten the useful life of the contactor.

Disclosed is system where the current spike can be reduced or eliminated when bringing two HVDC power channels into parallel.

In one prior approach to adding one HVDC source into parallel with another is to temporarily lower the voltage of the channel requesting to come on-line and use a pair of diodes and an auxiliary contactor to make the parallel connection while the voltage of the channel coming on line is ramped up. In this manner, the natural commutation of the diodes connects the capacitors at the point(s) in time when their voltages are equal and thereby avoid a current spike. When current is detected in both diodes, the main contactor is closed to provide paths around the diodes and the auxiliary contactors. While effective, that above approach required sensors and had a complicated contactor switching schemes described above. In addition, diodes have $V_f*I_f$ conduction losses.

Given these discoveries, herein disclosed is a system that utilizes series connected inductors without requiring diodes (that is, in some embodiments, no diodes are included) to add an HDVC source. As ideal inductors are energy storage elements which dissipate no real power. Power losses can be improved if inductor series resistance is minimized. Further, utilizing inductors as opposed to diodes can eliminate the need to lower the voltage of the HDVC channel being added. The disclosed system allows for busses with significantly different voltages during contactor closure to be paralleled without detrimental inrush current (due to the inherent property of inductors resisting instantaneous changes in current) without complicated procedures where the channel voltages are lowered.

FIG. 1 shows an example of bus 100 that includes a positive bus rail 102 and negative bus rail 104. The terms positive and negative merely refer to the fact that the rails 102, 104 can have a voltage differential. For example, the positive rail 102 can be at +270V and the negative rail 104 can be a −270V. Of course, depending on how grounded, these voltages could be +540V and 0V.

As illustrated the bus 100 is being driven by a first high voltage source 110. The first high voltage source 110 includes a prime mover 112 that drives a first AC generator 114. The prime mover 112 can be a spool of the gas turbine engine. The prime mover 112 is a high pressure spool of the gas turbine engine in one embodiment but can be other spools (e.g., low or medium) or can be an auxiliary power unit (APU) in one embodiment. The prime mover 112 can be connected to the first AC generator 114 by a gear box as is known in the art. The output of the first AC generator 114 is provided to a first rectifier 116 that converts the AC power received form the first AC generator 114 into a HVDC power. As shown, the first rectifier 116 produces a positive output (V+) on a first positive output line 120 and a negative output (V−) on a first negative output line 122. This can be accomplished in any known manner including having two rectifiers, one of which is inverting. The first positive output line 120 and the first negative output line 122 are connected to the positive and negative bus rails 102, 104, respectively.

First positive and negative smoothing capacitors 124, 126 are connected between the first positive output line 120 and the first negative output line 122, respectively, and ground to smooth the voltages provided on the first positive output line 120 and the first negative output line 122 (and thus, positive and negative bus rails 102, 104).

In shall be understood that the first high voltage source 110 can be connected to the bus by one or more contactors 128, 129 on the first positive output line 120 and the first negative output line 122, respectively. In FIG. 1 the contactors 128, 129 are shown as being closed.

As discussed above, in some instances it may be desirable to add connect a second high voltage source 130 to the bus 100. Herein disclosed is a bus coupling circuit 160 and method that may allow the second high voltage source 130 to be added without creating a large current spike.

As shown, the second high voltage source 130 is not connected to the bus 100 in FIG. 1 but based on the discussion herein, after the steps disclosed herein are performed, the second high voltage source 130 will be connected to the bus 100 in parallel with the first high voltage source 110. The first and second high voltage sources can also be referred to as first and second high voltage direct current (HVDC) sources herein.

As illustrated, similar to the first high voltage source 110, the second high voltage source 130 includes a second prime mover 142 that drives a second AC generator 144. The second prime mover 142 can be another spool of the gas turbine engine that is different than the first prime mover or can be an auxiliary power unit (APU). The second prime mover 142 can be connected to the second AC generator 144 by a gear box as is known in the art. The output of the second AC generator 144 is provided to a second rectifier 146 that converts the AC signal received form the second AC generator 144 into a HVDC signal. As shown, the second rectifier 146 produces a positive output (V+) on a second positive output line 150 and a negative output (V−) on a second negative output line 152. In another embodiment, the second high voltage source 130 could be a battery. In such a case, elements 142, 144, and 146 could be omitted replaced with a battery shown schematically by block 300.

Second positive and negative smoothing capacitors 154, 156 are connected between the second positive output line 150 and the second negative output line 152, respectively, and ground to smooth the voltages provided on second positive output line 150 and the second negative output line 152.

As illustrated, bus coupling circuit 160 is connected between the second high voltage source 130 and the bus 100. After the steps herein are performed, contactors 166 and 176 will couple the second positive output line 150 and the second negative output line 152 to the positive and negative bus rails 102, 104, respectively.

The bus coupling circuit 160 includes positive line coupler 161 and a negative line coupler 171 that, respectively, are connected to the second positive output line 150 and the second negative output line 152 and the positive and negative bus rails 102, 104.

Both the positive line coupler 161 and the negative line coupler 171 include main contactors that are connected in parallel to a serially connected inductor/auxiliary contactor combination. In particular, the positive line coupler 161 includes a first auxiliary contactor 162 serially connected to a first inductor 164 such that the inductor 164 allows current flow from the second high voltage source 130 to the bus 100. The order of the two components can be reversed. A first main contactor 166 is connected in parallel with the first auxiliary contactor 162/first inductor 164 combination.

In addition, negative positive line coupler 141 includes a first auxiliary contactor 162 serially connected to a second inductor 174 such that the inductor 164 allows current flow from the bus 100 to return to the second high voltage source 130. The order of the two components can be reversed. A second main contactor 176 is connected in parallel with the second auxiliary contactor 172/second inductor 174 combination.

Operation of the second high voltage source 130 and the bus coupling circuit 160 will now be described in the context of adding the second high voltage source 130 in parallel to the first high voltage source 110 at a time that the first high voltage source 110 is driving the bus 100. The discussion will refer to both FIGS. 1 and 2.

Figure 2:
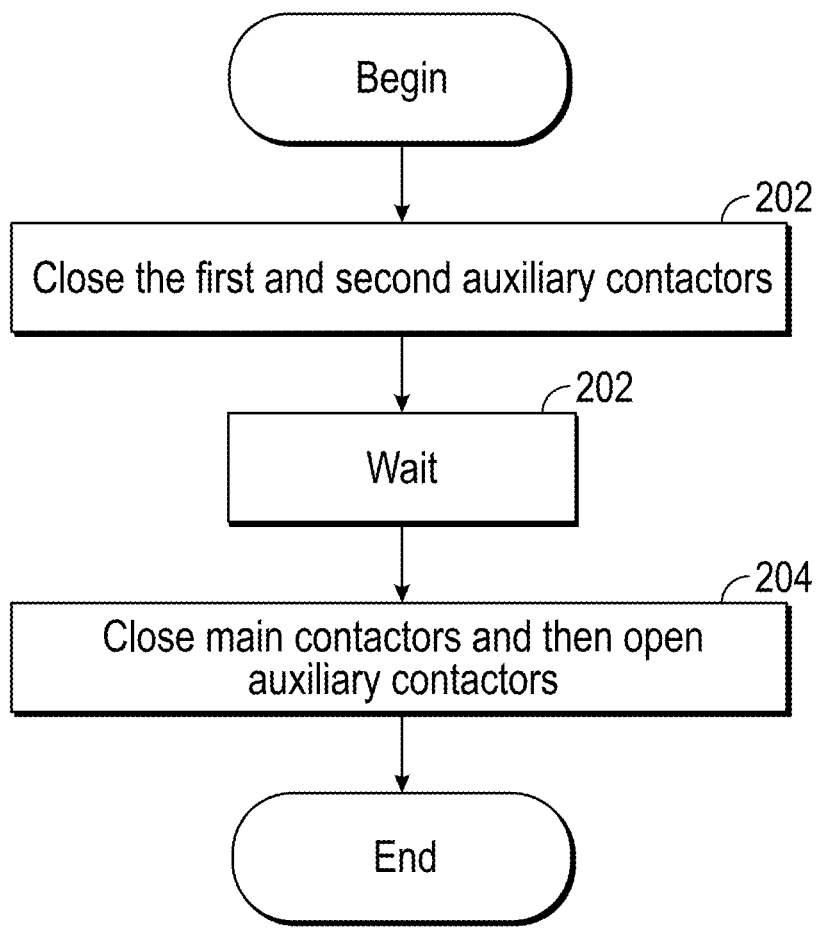
FIG. 2 is a flow chart illustrating a method of connecting two high voltage DC sources to a bus in parallel according to one embodiment.

As indicated at block 202, the first and second auxiliary contactors 162, 172 are closed. Then, after a predetermined or specified time (waiting time) after the first and second auxiliary contactors were closed, the main contactors the main contactors 166 and 176 are closed and the auxiliary contactors 162, 172 can be opened as indicated at block 204. The waiting time is indicated in FIG. 2 by block 203 and may be pre-determined using worst case system or component tolerances, or set based on current or other sensed parameters if available.

Based on the above description, the skilled artisan will realize that the natural resistance to instantaneous current changes in the first and second inductors 164, 174 is used to connect the capacitors of each high voltage source 110, 130 at the point(s) in time when their voltage is roughly equal and thereby avoid a current spike. In one embodiment, the main contactors 166 and 176 can each have two poles and be actuated by a single solenoid.

Further, it should be noted that as opposed to other approaches that involve either or both an inductor/diode, therein, when the main contactors 166/176 are closed and the auxiliary contactors 162, 172 can be opened any element that can impede or otherwise slow power distribution (e.g., an inductor or diode) is effectively removed from the circuit.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of connecting first and second high voltage direct current (HVDC) sources in parallel to bus including a positive rail and a negative rail, the first HVDC source having a first positive output line and a first negative output line and the second HVDC source having a second positive output line and a second negative output line, the method including:
- connecting the first HVDC source to the bus such that the first positive output line is connected to the positive rail and the first negative output line is connected to the negative rail;
- closing a first auxiliary contactor to connect the second positive output line to the positive rail through a first inductor;
- closing a second auxiliary contactor to connect the second negative output line to the negative rail through a second inductor;
- closing, after a specified time, a first main contactor that is connected in parallel with the first auxiliary contactor and the first inductor to connect the second positive output line to positive rail and a second main contactor that is connected in parallel with the second auxiliary contactor and the second inductor to connect the second negative output line to positive rail; and
- opening the first and second auxiliary contactors.

2. The method of claim 1, wherein the first HVDC source includes a first generator connected to a first prime mover.

3. The method of claim 2, wherein the first prime mover is a high pressure spool of a gas turbine engine.

4. The method of claim 3, wherein the second HVDC source includes a second generator connected to a second prime mover, wherein the second prime mover is one of: a low pressure spool of the gas turbine engine, a medium pressure spool of the gas turbine engine or an auxiliary power unit.

5. The method of claim 2, wherein the first prime mover is one of: a low pressure spool of a gas turbine engine, a medium pressure spool of the gas turbine engine or an auxiliary power unit.

6. The method of claim 3, wherein the second HVDC source includes a second generator connected to a second prime mover, wherein the second prime mover is a high pressure spool of the gas turbine engine.

7. A system for connecting first and second high voltage direct current (HVDC) sources in parallel to a bus including a positive rail and a negative rail, the first HVDC source having a first positive output line and a first negative output line and the second HVDC source having a second positive output line and a second negative output line, the system including:
- one or more contactors connecting the first HVDC source to the bus such that the first positive output line is connected to the positive rail and the first negative output line is connected to the negative rail;
- a bus coupling circuit located between the second HVDC source and the bus that, in operation, couples the second HVDC source to the bus such that first and second HVDC sources are in parallel, the second positive output is connected to the positive rail and the second negative output is connected to the negative rail, the bus coupling circuit including:
- a positive line coupler and a negative line coupler, the positive line coupler including a first auxiliary contactor and a first inductor connected in series and a first main contactor connected in parallel with the series connected first auxiliary contactor and first inductor, the negative line coupler including a second auxiliary contactor and a second inductor connected in series and a second main contactor connected in parallel with the series connected second auxiliary contactor and second inductor; and
- a controller configured to:
- close the first auxiliary contactor to connect the second positive output line to the positive rail through the first inductor;
- close the second auxiliary contactor to connect the second negative output line to the negative rail through the second conductor; and
- close the first and second main contactors after a specified time has elapsed after the first or second auxiliary contactors were closed.

8. The system of claim 7, wherein the controller is further configured to open the first and second auxiliary contactors after the first and second main contactors are closed.

9. The system of claim 7, wherein the first HVDC source includes a first generator connected to a first prime mover.

10. The system of claim 9, wherein the first prime mover is a high pressure spool of a gas turbine engine.

11. The system of claim 9, wherein the second HVDC source includes a second generator connected to a second prime mover, wherein the second prime mover is one of: a low pressure spool of the gas turbine engine, a medium pressure spool of the gas turbine engine or an auxiliary power unit.

12. The system of claim 11, wherein the second HVDC source includes a battery.

13. The system of claim 9, wherein the first prime mover is one of: a low pressure spool of a gas turbine engine, a medium pressure spool of the gas turbine engine or an auxiliary power unit.

14. The system of claim 13, wherein the second HVDC source includes a second generator connected to a second prime mover, wherein the second prime mover is a high pressure spool of the gas turbine engine.

15. The system of claim 13, wherein the second HVDC source includes a battery.

* * * * *